United States Patent
Falk et al.

(10) Patent No.: US 9,237,010 B2
(45) Date of Patent: Jan. 12, 2016

(54) SECURE TRANSMISSION OF A MESSAGE

(71) Applicants: Rainer Falk, Poing (DE); Steffen Fries, Baldham (DE)

(72) Inventors: Rainer Falk, Poing (DE); Steffen Fries, Baldham (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/403,907

(22) PCT Filed: Apr. 24, 2013

(86) PCT No.: PCT/EP2013/058517
§ 371 (c)(1),
(2) Date: Nov. 25, 2014

(87) PCT Pub. No.: WO2013/182347
PCT Pub. Date: Dec. 12, 2013

(65) Prior Publication Data
US 2015/0149779 A1    May 28, 2015

(30) Foreign Application Priority Data
Jun. 4, 2012 (DE) .......................... 10 2012 209 408

(51) Int. Cl.
*H04L 29/06* (2006.01)
*H04L 9/08* (2006.01)
*H04L 9/32* (2006.01)

(52) U.S. Cl.
CPC ............ *H04L 9/0847* (2013.01); *H04L 9/0866* (2013.01); *H04L 9/3247* (2013.01)

(58) Field of Classification Search
CPC .... H04L 9/0847; H04L 9/0866; H04L 9/3247

USPC .......................... 713/170–173, 150; 726/3, 7
See application file for complete search history.

(56) References Cited

U.S. PATENT DOCUMENTS

| | | | |
|---|---|---|---|
| 4,656,474 A | 4/1987 | Mollier et al. | |
| 4,864,616 A * | 9/1989 | Pond et al. | ..................... 713/165 |
| 5,970,143 A * | 10/1999 | Schneier et al. | ............... 713/181 |

(Continued)

FOREIGN PATENT DOCUMENTS

| | | |
|---|---|---|
| DE | 19919909 | 11/2000 |
| EP | 2194671 A2 | 6/2010 |

OTHER PUBLICATIONS

Hash Chain, Mar. 26, 2011, wikipedia.com.
(Continued)

*Primary Examiner* — Haresh N Patel
(74) *Attorney, Agent, or Firm* — Lempia Summerfield Katz LLC

(57) ABSTRACT

The embodiments relate to methods and apparatuses for producing secure transmission of a message. The methods are based on production of a basic key that is used for producing respective transmitter keys for a plurality of transmitters. For the ascertainment of the receiver keys by respective receivers, the basic key is transmitted to the receivers, which for their part are able to ascertain a receiver key for checking the integrity of the message from a respective transmitter on the basis of the basic key and an identifier for the transmitter. The receiver ascertains a cryptographic checksum, which, in the course of the integrity check, is compared with a cryptographic checksum that has been produced by the transmitter and sent along by the respective message. The embodiments may be used within the context of automation and sensor networks.

20 Claims, 3 Drawing Sheets

(56) References Cited

U.S. PATENT DOCUMENTS

| | | | |
|---|---|---|---|
| 7,278,128 B1* | 10/2007 | Trimberger | 716/117 |
| 7,664,048 B1* | 2/2010 | Yung et al. | 370/253 |
| 2002/0112152 A1* | 8/2002 | VanHeyningen et al. | 713/151 |
| 2002/0124169 A1* | 9/2002 | Agrawal et al. | 713/168 |
| 2003/0023845 A1* | 1/2003 | VanHeyningen | 713/151 |
| 2003/0177347 A1* | 9/2003 | Schneier et al. | 713/151 |
| 2007/0124578 A1* | 5/2007 | Paya et al. | 713/155 |
| 2007/0242683 A1* | 10/2007 | Pelletier et al. | 370/401 |
| 2007/0242703 A1* | 10/2007 | Pelletier et al. | 370/521 |
| 2007/0260891 A1* | 11/2007 | Starr et al. | 713/193 |
| 2008/0010218 A1* | 1/2008 | Zank | 705/75 |
| 2008/0114981 A1* | 5/2008 | Hars | 713/170 |
| 2009/0193265 A1* | 7/2009 | Andersson et al. | 713/189 |
| 2009/0239500 A1 | 9/2009 | Aripirala et al. | |
| 2009/0296926 A1 | 12/2009 | Perlman | |
| 2010/0031054 A1* | 2/2010 | Starr et al. | 713/189 |
| 2010/0146274 A1* | 6/2010 | Naslund et al. | 713/168 |
| 2011/0004758 A1* | 1/2011 | Walker et al. | 713/168 |
| 2011/0010547 A1* | 1/2011 | Noda | 713/168 |
| 2012/0311345 A1* | 12/2012 | Dhuse et al. | 713/189 |
| 2013/0111211 A1* | 5/2013 | Winslow et al. | 713/171 |
| 2013/0132541 A1* | 5/2013 | Falk et al. | 709/222 |

OTHER PUBLICATIONS

International Search Report and Written Opinion cited in PCT/EP2013/058517, mailed Jul. 24, 2013.

Key Derivation Function, Jun. 11, 2011, wikipedia.com.

Lucks et al., Concrete Security for Entity Recognition: The Jane Doe Protocol, Full Paper, 2009, pp. 1-20, International Association for Cryptologic Research.

Perrig et al., SPINS: Security Protocols for Sensor Networks, 2001, pp. 189-199, Proceedings of the 7th Annual International Conference on Mobile Computing and Networking.

Perrig et al., The TESLA Broadcast Authentication Protocol, Summer/Fall 2002, pp. 2-13, RSA Laboratories Cryptobytes.

Rui Ying et al., An Efficient Key Management Scheme for Secure Sensor Networks, IEEE Conference Proceedings Article, 2005, pp. 279-283, Parallel and Distributed Computing, Applications and Technologies PDCAT 2005.

German Office Action for related German Application No. 10 2012 211 031.3, mailed Mar. 4, 2014, with English Translation.

Haifeng Li et al., Minimum Entropy Clustering and Application to Gene Expression Analysis, pp. 142-151, Computational Systems Bioinformatics Conference, Aug. 16-19, 2004.

Kattan, Evolution of Human-Competitive Lossless Compression Algorithms with Gp-zip2, Genetic Programming and Evolvable Machines, vol. 12, No. 1, Springer Science and Business Media, Mar. 2011.

Kattan, Universal Intelligent Data Compression Systems: a Review, Computer Science and Electronic Engineering Conference, Sep. 8-9, 2010.

Yongjin et al., Minimum Entropy, K-Means, Spectral Slustering, pp. 117-122, vol. 1, IEEE International Joint Conference on Neural Networks, Jul. 25-29, 2004.

* cited by examiner

SECURE TRANSMISSION OF A MESSAGE

CROSS-REFERENCE TO RELATED APPLICATIONS

The present patent document is a §371 nationalization of PCT Application Serial Number PCT/EP2013/058517, filed Apr. 24, 2013, designating the United States, which is hereby incorporated by reference, and this patent document also claims the benefit of DE 10 2012 209 408.3, filed on Jun. 4, 2012, which is also hereby incorporated by reference.

TECHNICAL FIELD

The embodiments relate to methods and devices for producing a secure transmission of a message.

BACKGROUND

In automation and sensor networks, there is a need to guarantee integrity of data to be transmitted between different systems. This may be done by protecting the data with a cryptographic checksum, such as a message authentication code, message integrity code or digital signature, for example. A key management process is needed for this purpose, which supplies the systems involved with the necessary security parameters.

Transferring data using messages in automation and sensor networks is often done by broadcast messages or multicast messages.

In a widely established key management method for broadcast messages or multicast messages, which is used, for example, with Wireless Local Area Network (WLAN) based on standard Institute of Electrical and Electronics Engineers (IEEE) 802.11, the user nodes are informed of the multicast key or broadcast key by the access point. This has the disadvantage that a user node that has been tampered with may impersonate the broadcast/multicast sender, e.g., the access point.

For a secure broadcast/multicast transmission method, it has therefore been proposed to change relatively frequently the key used for sending broadcast/multicast messages, and to make the key accessible to a receiver node only after a time delay. Once the key used by the sender is known to the receiver node, then the key is already no longer valid for sending.

Using what are known as hash chains is a known option for providing keys for multicast scenarios. In this case, a plurality of keys are calculated in advance, wherein one particular key may be used for one specific period, which may be limited in terms of time or on the basis of messages to be sent.

Time Efficient Stream Loss-tolerant Authentication (TESLA) is a multicast protocol based on hash chains. A variation of the TESLA protocol is explained in greater detail under μTESLA. In this case, a particular multicast sender manages its own hash chain. A receiver manages respective hash-chain data explicit to each multicast sender. Such a method is suitable for the situations in which a single multicast sender serves a multiplicity of receiver nodes.

Embedded systems, which have limited processing and memory capacity, are often used in automation and sensor network systems. The TESLA multicast protocol is unsuitable especially for these systems because the hash chain takes into account parameters for a multiplicity of senders, which may result in the embedded system rapidly reaching its physical limits.

SUMMARY AND DESCRIPTION

The scope of the present invention is defined solely by the appended claims and is not affected to any degree by the statements within this summary. The present embodiments may obviate one or more of the drawbacks or limitations in the related art.

The embodiments define methods and devices that guarantee a secure transmission of data even for systems having limited physical resources.

The embodiments relate to a method for producing a secure transmission of a message, which method includes the following acts: (1) generating a base key by a key unit; (2) generating a sender key for the at least one sender by the key unit by a key derivation function on the basis of (i) the base key, and (ii) an identifier that uniquely identifies the at least one sender; (3) transmitting the sender key to the at least one sender; (4) calculating a first cryptographic checksum by the at least one sender for the respective message on the basis of the sender key and the message; (5) transmitting the message together with the first cryptographic checksum to a receiver; (6) transmitting the base key to the receiver; (7) producing a receiver key by the receiver by the key derivation function on the basis of (i) the base key, and (ii) the identifier of the sender of the message; (8) generating a second cryptographic checksum for the message by the receiver on the basis of the receiver key and the message; and (9) checking the integrity of the message by comparing the first cryptographic checksum with the second cryptographic checksum, where the integrity of the message is given if the first cryptographic checksum and the second cryptographic checksum are identical.

The embodiments have the advantage that complex generation of a base key, for example, by a hash chain or by a cryptographically strong random number generator, only has to be performed once for a plurality of senders, and sender keys, (e.g., individual keys for each sender), may be generated in a simpler and less complex manner.

In addition, complex checking of the integrity of a multiplicity of base keys is dispensed with at the receiver end, because only a single base key, which is used as the basis for generating a multiplicity of sender keys and receiver keys, needs to be checked for authenticity.

Key derivation functions are understood to refer to functions that generate one or more keys from two or more pieces of information, for instance in the present case on the basis of the base key and the identifier of the respective sender. Such key derivation functions are sufficiently known to a person skilled in the art, or in the form of cryptographic hash functions such as MD5, SHA1, SHA256, cryptographic keyed hash functions such as HMAC-MD5, HMAC-SHA1, HMAC-SHA256, or AES-CBC-MAC.

An identifier shall be understood to refer to a description of the sender that uniquely identifies this sender. This may be, for example, an IP address or MAC address but also a firmware version or a product specification that allows a unique assignment to the respective sender. The cryptographic checksums are calculated on the basis of the respective message and the sender key or receiver key. Established techniques may be used here to determine or check a cryptographic checksum, for instance, a message authentication code (MAC), a message integrity code (MIC), or a digital signature.

The method also has the advantage that only a single base key needs to be transmitted to the receiver(s) for a plurality of senders because the receivers may advantageously generate the respective receiver keys themselves. This also has the advantage that only a small bandwidth is needed to transmit key material.

Confining the key management process to the key unit achieves a reduction in the processing and memory complexity of the respective sender for managing its key material. The method may thereby be implemented and executed on the smallest sender units such as, for example, embedded systems. In addition, by virtue of the key management process being handled solely by the key unit, it is achieved that a sender does not obtain information about the base key, and therefore the sender may not make inferences about sender keys of other senders. This further increases the security.

The sender key is transmitted in a cryptographically secure manner to the respective sender. This increases the security in establishing the integrity of a message, because it prevents an attacker simply intercepting or tampering with the sender key.

In one embodiment, the base key and the sender key are selected to be valid only within a first time interval, and the base key is not transmitted to the receiver until after the first time interval has elapsed. This increases the security of the method because constant changing of the base key and the associated sender key and receiver key makes it harder to falsify messages from the respective sender.

In one embodiment, the base key is selected from an element of a hash chain. In this case, consecutive base keys from two consecutive time intervals are selected from two consecutive elements of the hash chain. This has the advantage that the integrity of the base key may also be checked on the basis of its position in the hash chain. This further increases the security of the method.

In an optional embodiment, part of the message, in particular an IP address or a MAC address of the sender, may be selected as the identifier. This is a particularly simple way to enable the sender to calculate a unique identifier of said sender from part of the message to be transmitted. The Internet Protocol (IP) address and the Media Access Control (MAC) address are known from the prior art.

As an alternative or in addition thereto, a name of the sender in the form of a Uniform Resource Locator (URL) may be selected as the identifier. This embodiment is also a simple way of calculating a unique identifier of the sender, which identifier is accessible to both the sender and the receiver in the simplest manner.

The embodiments also relate to a device for producing a secure transmission of a message, which device includes the following units: (1) a first unit for generating a base key by a key unit; (2) a second unit for generating a sender key for the at least one sender by the key unit by a key derivation function on the basis of (i) the base key, and (ii) an identifier that uniquely identifies the at least one sender; (3) a third unit for transmitting the sender key to the at least one sender; (4) a fourth unit for calculating a first cryptographic checksum by the at least one sender for the respective message on the basis of the sender key and the message; (5) a fifth unit for transmitting the message together with the first cryptographic checksum to a receiver; (6) a sixth unit for transmitting the base key to the receiver; (7) a seventh unit for producing a receiver key by the receiver by the key derivation function on the basis of (i) the base key, and (ii) the identifier of the sender of the message; (8) an eighth unit for generating a second cryptographic checksum for the message by the receiver on the basis of the receiver key and the message; and (9) a ninth unit for checking the integrity of the message by comparing the first cryptographic checksum with the second cryptographic checksum, where the integrity of the message is given if the first cryptographic checksum and the second cryptographic checksum are identical.

The advantages and embodiment of individual units may be considered analogously to the acts of the method presented above. In particular, allocating the key management process to the key unit achieves a reduction in the processing and memory complexity for guaranteeing a secure transmission of a message for the senders and receivers.

In a development, the device includes at least one further unit, which may be used to implement and execute at least one of the method acts.

DETAILED DESCRIPTION

Elements that have the same function and principle of operation are denoted by the same reference signs in the figures.

Figure 1:
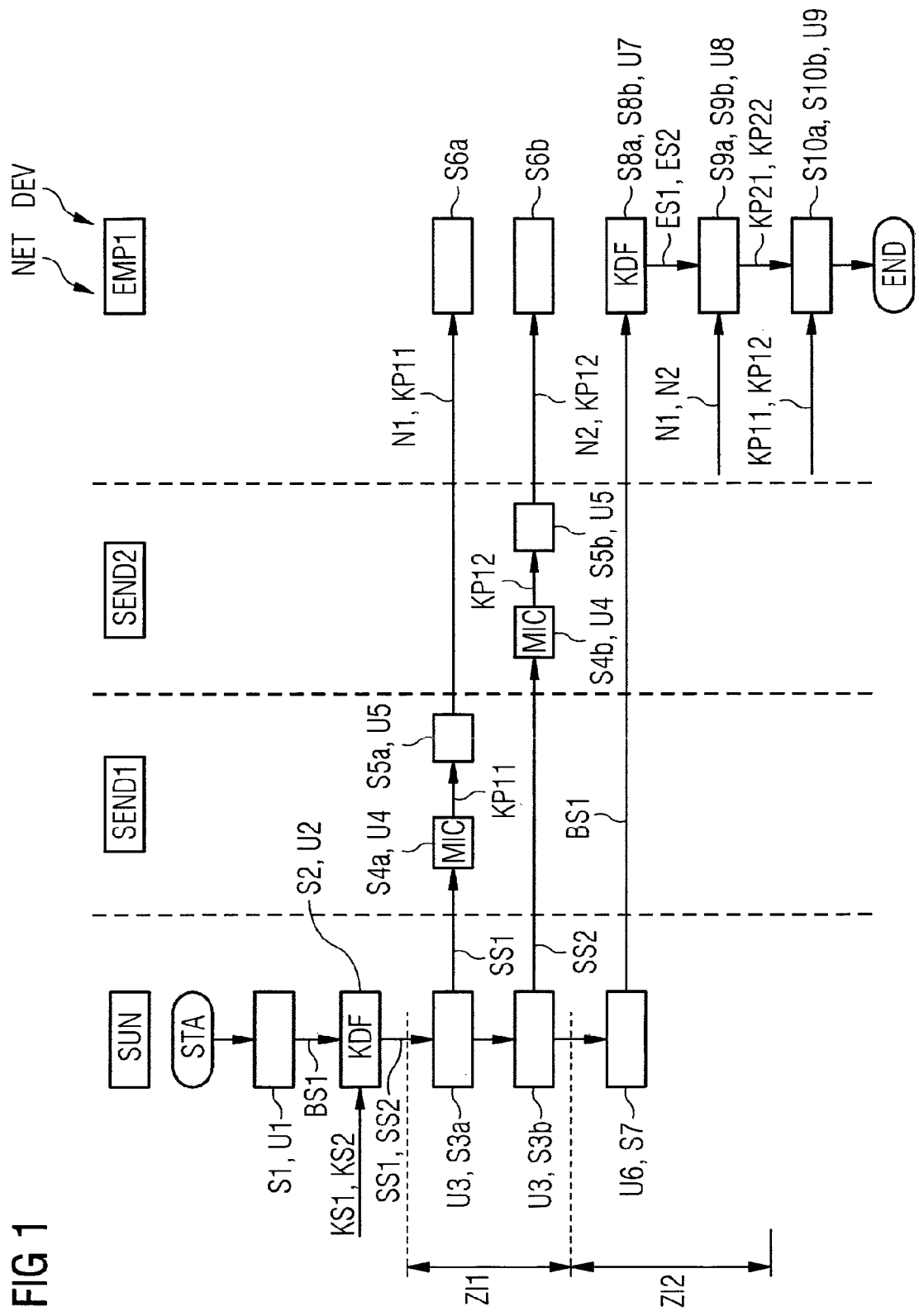
FIG. 1 depicts a flow diagram of an embodiment employing key unit, sender, and receiver.

FIG. 1 depicts a first exemplary embodiment in the form of a flow diagram. In this embodiment, a network NET includes the network elements: key unit SUN, first sender SEND1, second sender SEND2, and receiver EMP1. The network elements are interconnected by a Local Area Network (LAN).

The flow diagram is started in the state STA.

In act S1, the key unit SUN generates a base key BS1. The base key may be, for example, a randomly selected number or an element of a hash chain. In the present example, BS1=173399. Act S1 is implemented by a first unit U1.

In act S2, the key unit generates a separate sender key SS1, SS2 for each of the senders SEND1, SEND2. A key derivation function KDF is used for this purpose to generate the respective sender key on the basis of the base key BS1 and an identifier KS1, KS2 of the first sender and second sender respectively. The IP address or MAC address of the respective sender or a name of the respective sender, which name is known in the network, for example coded as a URL, for instance in the form "SEND1.PC.DE", is used, for example, as the identifier of the respective sender. In the present case, KS1=192.168.178.17 and KS2=192.168.178.233, e.g., the IP address assigned to the respective senders. Act S2 is implemented by a second unit U2.

Key derivation functions are understood to refer to functions that generate one or more keys from two or more pieces of information, for instance in the present case on the basis of the base key and the identifier of the respective sender. Such key derivation functions are sufficiently known to a person skilled in the art, or in the form of cryptographic hash functions such as MD5, SHA1, SHA256, and cryptographic keyed hash functions such as HMAC-MD5, HMAC-SHA1, HMAC-SHA256, or AES-CBC-MAC.

Hence the sender keys SS1, SS2 of the first and second senders are generated as follows:

$$SS1=KDF(BS1, KS1);$$

$$SS2=KDF(BS1, KS2).$$

In the present example this produces the result SS1=995533 and SS2=123456.

In act S3a, the sender key SS1 of the first sender is transmitted to the first sender. Similarly, in act S3b, the sender key SS2 of the second sender is transmitted to the second sender. Each of the sender keys may also be transmitted in encrypted form in order to provide increased security in the network. The act is implemented by a third unit U3.

After the first sender receives the sender key, it calculates in act S4a a first cryptographic checksum KP11 for a first message N1 to be transmitted. The checksum is calculated on the basis of the sender key SS1 and the message content of the message N1. The cryptographic checksum may be referred to as a message authentication code (MAC), as a message integrity code (MIC) or a digital signature. Symmetric or asymmetric cryptographic techniques may be used here. Examples are HMAC-SHA1, AES-CBC-MAC, AES-UMAC, RSA Signature, DSA and ECC-DSA. In order to avoid confusion with the term MAC address, the cryptographic checksum is referred to below as a message integrity code (MIC). A MIC function MIC(K,D) determines a cryptographic checksum on the basis of a cryptographic key K and data D. Similarly, in act S4b, the second sender uses its sender key SS2 to generate a first cryptographic checksum KP12 for a second message N2. This is expressed by the following equations:

$KP11=MIC(SS1,N1);$ $KP12=MIC(SS2,N2).$

The fourth act is implemented by a fourth unit U4.

In act S5a, implemented by a fifth unit U5, the first sender transmits the first message and the first cryptographic checksum KP11 belonging thereto to the receiver EMP1, which, in act S6a, receives this message containing the first cryptographic checksum and stores same temporarily for the subsequent authenticity check. In addition, in act S5b, the second sender sends the second message and the first cryptographic checksum KP12 belonging thereto to the receiver, which, in act S6b, receives this message containing the first cryptographic checksum and stores same temporarily for the subsequent authenticity check.

In act S7, the key unit SUN transmits the base key BS1 to the receiver, for example after a first time interval ZI1=1 minute has elapsed. Act S7 is implemented by a sixth unit U6.

In act S8a, implemented by a seventh unit U7, the receiver generates a first receiver key ES1 by the key derivation function KDF on the basis of the base key BS1 and the identifier KS1 of the first sender S1, e.g., ES1=KDF (BS1, KS1).

In act S9a, a second cryptographic checksum KP21 for the first message N1 is generated on the basis of the receiver key ES1 and a message content of the first message N1. Act S9a is implemented by an eighth unit U8.

In addition, the receiver checks in act S10a the integrity, (e.g., the authenticity), of the first message N1 by comparing the first checksum KP11 with the second cryptographic checksum KP21. If both cryptographic checksums are identical, or if the verification of a digital signature produces a positive result, then the integrity of the first message is given. Act S10a is implemented by a ninth unit U9.

In order to check the integrity of the second message, in act S8b, the receiver generates a receiver key ES2 for the second sender by the key derivation function KDF on the basis of the base key BS1 and the identifier KS2 of the second sender, e.g., ES2=KDF(BS1, KS2).

In act S9b, a second cryptographic checksum KP22 is generated for the second message on the basis of the receiver key of the second sender and a message content of the second message N2.

In act S10b, the receiver compares the first cryptographic checksum KP12 of the second message N2 with the second cryptographic checksum KP22 that it has calculated for the second message. If both cryptographic checksums are identical, or if the verification of a digital signature produces a positive result, then the integrity of the second message N2 is given.

The flow diagram in FIG. 1 ends in the state END.

Figure 2:
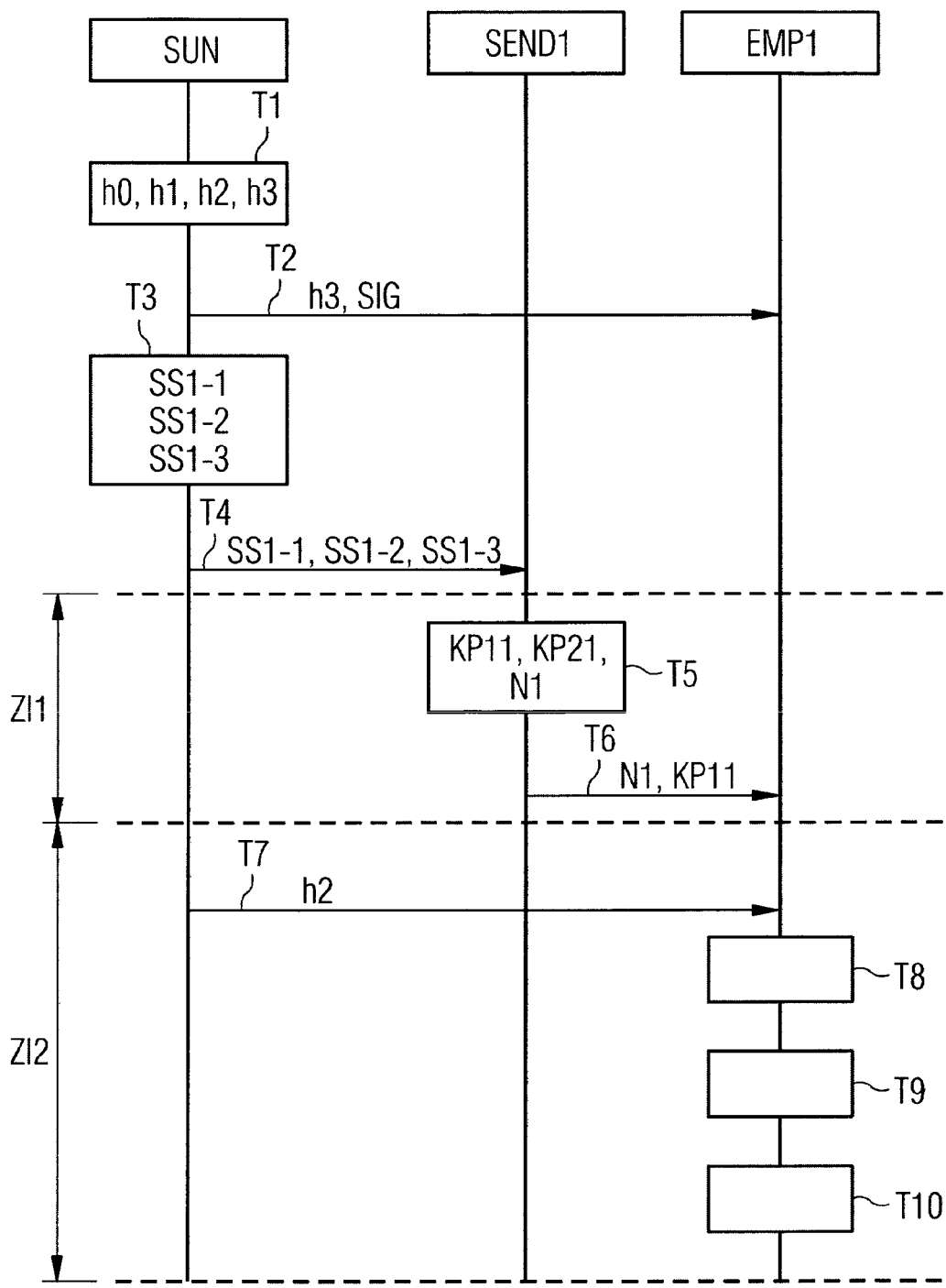
FIG. 2 depicts a flow diagram of an embodiment in which elements of a hash chain are used as the base key.

FIG. 2 depicts a further exemplary embodiment. The units key unit SUN, sender SEND1, and receiver EMP1 are used in a similar way to FIG. 1 in this embodiment. The key unit SUN, the sender SEND1, and the receiver EMP1 are interconnected via a network for the purpose of data transfer.

In act T1, the key unit generates a random starting point H0 for a hash chain, and hash chain elements H1, H2, H3 according to the following rule:

$H1=Hash(H0),$ $H2=Hash(H1),$ and $H3=Hash(H2).$

Using hash chains and generating hash elements by the hash(.) function are known. Each of the hash elements represents a base key that is valid only in a certain time interval.

In act T2, the key unit transmits the hash element H3 in signed form SIG to the receiver. The hash element H3 represents what is known as the hash chain anchor, which is used below to verify whether further hash elements are correct.

In act T3, the key unit generates three sender keys SS1-1, SS1-2, SS1-3 for the sender SEND1 on the basis of the hash elements and the identifier of the sender in the following manner:

$SS1\text{-}3=KDF(H2,KS1),$ valid for a first time interval ZI1;

$SS1\text{-}2=KDF(H1,KS1),$ valid for a second time interval ZI2;

$SS1\text{-}1=KDF(H0,KS1),$ valid for a third time interval ZI3.

The three sender keys are each valid only within one time interval, e.g., SS1-1 within the second time interval.

In act T4, the sender keys SS1-1, SS1-2, SS1-3 are transmitted to the sender.

In act T5, the sender calculates the first cryptographic checksum KP11 on the basis of the sender key SS1-3 and a content of the message N1.

In act T6, the sender transmits the message N1 and the first cryptographic checksum KP11 to the receiver, which receives and temporarily stores same.

Not until after the first time interval ZI1 has elapsed does the key unit transmit the hash element H2, in act T7. In act T8, the receiver first checks whether the received hash element H2 and the hash chain anchor H3 actually belong to a hash chain, e.g., whether the condition H3=Hash (H2) is true. If this is the case, the base key has been received correctly in the form of the hash element H2. In certain embodiments, the integrity of a hash element for a time interval is checked on the basis of a hash element from the time interval preceding the time interval.

In act T9, the receiver first calculates the receiver key by the key derivation function KDF on the basis of the base key, (e.g., the hash element H2 valid in the time interval), and the identifier KS1 of the sender, (e.g., ES1=KDF (H2, KS1)).

In act T10, the receiver then generates a second cryptographic checksum KP21 for the received message N1 on the basis of the message content of the message N1 and on the basis of the receiver key ES1.

Finally, in act T11, the integrity of the message N1 is checked by comparing the first and second cryptographic checksums. If both checksums are identical then the integrity of the message is given.

In the exemplary embodiment depicted in FIG. 2, the sender key SS1-3 is valid only within the first time interval ZI1. The sender key SS1-3 is not used outside this first time interval ZI1. For example, the sender key SS1-2 is used within the second time interval ZI2. In addition, the base key for calculating the receiver key is not transmitted until after the respective time interval has elapsed. In FIG. 2, the base key H2, which has been selected to generate the sender key SS1-3 valid in the first time interval ZI1, is not transmitted to the receiver until after the first time interval ZI1 has elapsed.

Figure 3:
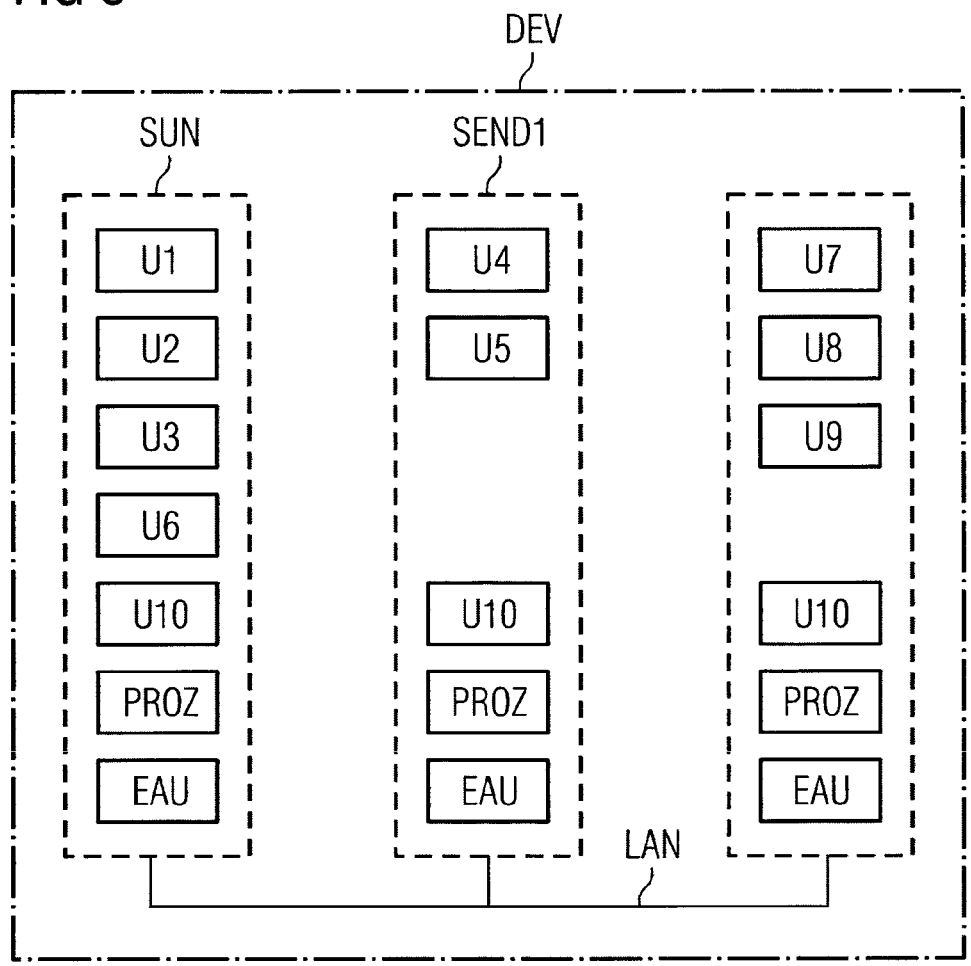
FIG. 3 depicts an example of a design of the key unit, the sender, and the receiver.

The units U1, . . . , U10 may be implemented and executed in software, hardware or in a combination of software and hardware. Hence, the acts implemented by the units may be stored as program code on a storage medium, in particular on a hard disk, CD-ROM or memory module, wherein the individual instructions of the program code are read and processed by at least one processing unit including a processor PROZ. The processor is connected to the storage medium via a bus for data transfer. In addition, an input/output unit may be connected via the bus LAN, wherein data such as messages, sender keys or base keys, for example, may be received and/or sent by the input/output unit EAU. In addition, the units may also be implemented and executed in distributed form across a plurality of processing units, wherein a processing unit is assigned to the key unit, a further processing unit is assigned to the sender, and another processing unit is assigned to the receiver; see FIG. 3 for example.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for producing a secure transmission of a message, the method comprising:
generating a base key by a key unit;
generating a sender key for at least one sender by the key unit by a key derivation function on the basis of (i) the base key, and (ii) an identifier that uniquely identifies the at least one sender;
transmitting the sender key to the at least one sender;
calculating a first cryptographic checksum by the at least one sender for the message on the basis of the sender key and the message;
transmitting the message together with the first cryptographic checksum to a receiver;
transmitting the base key the receiver;
producing a receiver key by the receiver by the key derivation function on the basis of (i) the base key, and (ii) the identifier of the sender of the message;
generating a second cryptographic checksum for the message by the receiver on the basis of the receiver key and the message;
checking an integrity of the message by comparing the first cryptographic checksum with the second cryptographic checksum, where the integrity of the message is given when the first cryptographic checksum and the second cryptographic checksum are identical.

2. The method as claimed in claim 1, wherein the sender key is transmitted in a cryptographically secure manner.

3. The method as claimed in claim 2, wherein the base key and the sender key are selected to be valid only within a first time interval, and wherein the base key is transmitted after the first time interval has elapsed.

4. The method as claimed in claim 3, wherein the base key is selected from an element of a HASH chain.

5. The method as claimed in claim 4, wherein an IP address or a MAC address of the message of the sender is selected as the identifier.

6. The method as claimed in claim 4, wherein a name of the sender in the form of a Uniform Resource Locator is selected as the identifier.

7. The method as claimed in claim 2, wherein the base key is selected from an element of a HASH chain.

8. The method as claimed in claim 2, wherein an IP address or a MAC address of the message of the sender is selected as the identifier.

9. The method as claimed in claim 2, wherein a name of the sender in the form of a Uniform Resource Locator is selected as the identifier.

10. The method as claimed in claim 1, wherein the base key and the sender key are selected to be valid only within a first time interval, and wherein the base key is transmitted after the first time interval has elapsed.

11. The method as claimed in claim 10, wherein the base key is selected from an element of a HASH chain.

12. The method as claimed in claim 10, wherein an IP address or a MAC address of the message of the sender is selected as the identifier.

13. The method as claimed in claim 10, wherein a name of the sender in the form of a Uniform Resource Locator is selected as the identifier.

14. The method as claimed in claim 1, wherein the base key is selected from an element of a HASH chain.

15. The method as claimed in claim 1, wherein an IP address or a MAC address of the message of the sender is selected as the identifier.

16. The method as claimed in claim 1, wherein a name of the sender in the form of a Uniform Resource Locator is selected as the identifier.

17. A device for producing a secure transmission of a message, the device comprising:
a first unit for generating a base key by a key unit;
a second unit for generating a sender key for at least one sender by the key unit by a key derivation function on the basis of (i) the base key, and (ii) an identifier that uniquely identifies the at least one sender;
a third unit for transmitting the sender key to the at least one sender;
a fourth unit for calculating a first cryptographic checksum by the at least one sender for the message on the basis of the sender key and the message;
a fifth unit for transmitting the message together with the first cryptographic checksum to a receiver;
a sixth unit for transmitting the base key to the receiver;

a seventh unit for producing a receiver key by the receiver by the key derivation function on the basis of (i) the base key, and (ii) the identifier of the sender of the message;

an eighth unit for generating a second cryptographic checksum for the message by the receiver on the basis of the receiver key and the message;

a ninth unit for checking an integrity of the message by comparing the first cryptographic checksum with the second cryptographic checksum, where the integrity of the message is given when the first cryptographic checksum and the second cryptographic checksum are identical.

18. The device as claimed in claim 17, further comprising a tenth unit for performing one or more of the following:
   (1) transmitting the sender key in a cryptographically secure manner;
   (2) transmitting the base key after a first time interval has elapsed, wherein the base key and the sender key are selected to be valid only within the first time interval;
   (3) selecting the base key from an element of a HASH chain; or
   (4) selecting an IP address or a MAC address of the message of the sender as the identifier or selecting a name of the sender in the form of a Uniform Resource Locator as the identifier.

19. A device for producing a secure transmission of a message, the device comprising:

first unit for generating a base key by a key unit;

a second unit for generating a sender key for the at least one sender by the key unit by a key derivation function on the basis of (i) the base key, and (ii) an identifier that uniquely identifies the at least one sender;

a third unit for transmitting the sender key to the at least one sender;

a fourth unit for calculating a first cryptographic checksum by the at least one sender for the message on the basis of the sender key and the message;

a fifth unit for transmitting the message together with the first cryptographic checksum to a receiver;

a sixth unit for transmitting the base key to the receiver;

a seventh unit for producing a receiver key by the receiver by the key derivation function on the basis of (i) the base key, and (ii) the identifier of the sender of the message;

an eighth unit for generating a second cryptographic checksum for the message by the receiver on the basis of the receiver key and the message;

a ninth unit for checking an integrity of the message by comparing the first cryptographic checksum with the second cryptographic checksum, where the integrity of the message is given when the first cryptographic checksum and the second cryptographic checksum are identical.

20. The device as claimed in claim 19, further comprising a tenth unit for performing one or more of the following:
   (1) transmitting the sender key in a cryptographically secure manner;
   (2) transmitting the base key after a first time interval has elapsed, wherein the base key and the sender key are selected to be valid only within the first time interval;
   (3) selecting the base key from an element of a HASH chain; or
   (4) selecting an IP address or a MAC address of the message of the sender as the identifier or selecting a name of the sender in the form of a Uniform Resource Locator as the identifier.

* * * * *